United States Patent [19]
Lynch et al.

[11] Patent Number: 6,119,094
[45] Date of Patent: Sep. 12, 2000

[54] AUTOMATED SYSTEM FOR IDENTIFYING ALTERNATE LOW-COST TRAVEL ARRANGEMENTS

[75] Inventors: Michael F. Lynch, Dallas; Jonathan A. Turner, Plano, both of Tex.

[73] Assignee: Electronic Data Systems Corporation, Plano, Tex.

[21] Appl. No.: 08/610,107

[22] Filed: Feb. 29, 1996

[51] Int. Cl.[7] .................................................. G06F 17/60
[52] U.S. Cl. ........................ 705/5; 705/6; 707/1; 707/10
[58] Field of Search ............................. 705/5, 6; 707/10, 707/1

[56] References Cited

U.S. PATENT DOCUMENTS

| | | | |
|---|---|---|---|
| 4,862,357 | 8/1989 | Ahlstrom et al. | 364/407 |
| 4,931,932 | 6/1990 | Dainekoff et al. | 364/407 |
| 5,021,953 | 6/1991 | Webber et al. | 364/407 |
| 5,191,523 | 3/1993 | Whitesage | 364/407 |
| 5,237,499 | 8/1993 | Garback | 364/407 |
| 5,253,166 | 10/1993 | Dettelbach et al. | 363/407 |
| 5,255,184 | 10/1993 | Hornick et al. | 364/407 |
| 5,309,355 | 5/1994 | Lockwood | 364/407 |
| 5,331,546 | 7/1994 | Webber et al. | 364/407 |
| 5,422,809 | 6/1995 | Griffin et al. | 364/407 |
| 5,553,280 | 9/1996 | Fortier | 707/1 |
| 5,570,283 | 10/1996 | Shoolery et al. | 364/401 |
| 5,586,313 | 12/1996 | Johnson et al. | 707/10 |
| 5,644,721 | 7/1997 | Chung et al. | 395/206 |
| 5,658,900 | 7/1997 | Bowen et al. | 395/205 |

FOREIGN PATENT DOCUMENTS 0 690 398 A1  1/1996  European Pat. Off. .
WO 93/10502  5/1993  WIPO .

OTHER PUBLICATIONS

Dialog®file 610, Business Wire, No. 46868, "COVIA CORP:IntroducesFOCALPOINT; First Travel Agency Application of IBM Personnal–System 2", 3 pages, dated Apr. 2, 1987.

Mary Brisson, "Covia E–Mail Offers Shortcut for Agencies", Business Travel News, p.1, dated Nov. 2, 1992.

Danna K. Henderson, "Computer Reservations System Plunge into the PC Era, (Personal Computers)", Air Transport World, v. 25, No. 8, p. 47(6) dated Aug. 1988.

*Primary Examiner*—Emanuel Todd Voeltz
*Assistant Examiner*—Raquel Alvarez
*Attorney, Agent, or Firm*—L. Joy Griebenow; Baker & Botts L.L.P.

[57] ABSTRACT

An automated system (10) is provided for identifying alternate low-cost travel arrangements. The system (10) obtains inventory information specifying the rates and/or availability of a plurality of travel arrangements, from one or more computer reservation systems. The inventory information is stored in a database (14) along with one or more portfolios of information (relating to a travel agency and each business entity customer of the travel agency) that can be used to discount the listed rates of the travel arrangements. In response to travel request information received from a customer, the system (10) automatically retrieves the inventory and/or discount information from the database (14) and determines a plurality of low-cost alternate travel arrangements that are available to the customer Consequently, a travel agent using the system (10) does not have to spend time manually identifying alternate low-cost travel arrangements.

23 Claims, 2 Drawing Sheets

AUTOMATED SYSTEM FOR IDENTIFYING ALTERNATE LOW-COST TRAVEL ARRANGEMENTS

This application is related to co-pending application Ser. No. 08/609,034, entitled *Automated Travel Planning System,* and filed on Feb. 29, 1996; and copending application Ser. No. 08/618,005, entitled *Automated Travel Pricing System,* and filed on Mar. 18, 1996. This application is also related to U.S. Pat. No. 5,839,114, entitled *Automated System for Selecting an Initial Computer Reservation System,* which will issue on Nov. 17, 1998, from application Ser. No. 08/609,040, filed on Feb. 29, 1996.

TECHNICAL FIELD OF THE INVENTION

This invention relates generally to the field of travel reservation services, and more particularly, to an automated system for identifying alternate low-cost travel arrangements and method of operation.

BACKGROUND OF THE INVENTION

In many cases, a customer using a travel agency is not absolutely committed to any specific travel plan, but instead may have some flexibility in traveling. One of the services provided by a travel agent is determining whether the customer has any flexibility in traveling and afterwards identifying one or more alternate, low-cost travel arrangements that are available to the customer. For example, a customer who states that he/she would like to fly from Houston to New York on Tuesday, October 8th and return on Friday, October 11th may actually be open to returning on Sunday, October 13th instead, if the cost of traveling would thereby be reduced.

Previously, this process of identifying alternate low-cost travel arrangements could only be performed manually by the travel agent, and therefore was extremely inefficient. More specifically, a travel agent was required to access one or more computer reservation systems to obtain inventory information, such as availability and/or rates, for a plurality of alternate travel arrangements. Then, the travel agent was required to consider any special provisions that would also reduce the price of traveling (e.g., staying over a Saturday night). Since the travel agent could not serve other customers during the above-mentioned steps, the agent's productivity decreased.

Furthermore, even though a travel agent could become more efficient in the process with experience, it could not be guaranteed that the process would always produce all of the alternate, low-cost travel arrangements. In other words, because so much of the prior process required input and/or calculation by a travel agent, the accuracy of the process was extremely susceptible to human error.

Although a prior system for determining low-cost alternate travel arrangements (i.e., the "Bargain Finder" system) is available, this prior system operates on only one computer reservation system (i.e., the SABRE system owned by American Airlines), which does not include information about all of the possible flights between a departure city and a destination city. Consequently, this prior system is not able to consistently find all of the low-cost alternate flights in response to a customer's request.

SUMMARY OF THE INVENTION

Accordingly, a need has arisen for an automated system that identifies a plurality of alternate low-cost travel arrangements that may be offered or recommended to a customer submitting a travel request to a travel agency.

In accordance with the preferred embodiment of the present invention, an automated system is provided for identifying alternate low-cost travel arrangements. The system obtains inventory information, specifying the rates and/or availability of a plurality of travel arrangements, from one or more computer reservation systems. The inventory information is stored in a database along with one or more portfolios of information (relating to a travel agency and each business entity customer of the travel agency) that can be used to discount the listed rates of the travel arrangements. In response to travel request information received from a customer, the system automatically retrieves the inventory and/or discount information from the database and determines a plurality of low-cost alternate travel arrangements that are available to the customer.

An important technical advantage of the present invention includes automatically determining a plurality of low-cost, available travel arrangements so that a travel agent does not have to spend time manually deriving the same.

Another important technical advantage of the present invention is that the opportunity for human error in identifying alternate low-cost travel arrangements is substantially reduced or eliminated.

BRIEF DESCRIPTION OF THE DRAWINGS

For a better understanding of the present invention, reference may be made to the accompanying drawings, in which.

DETAILED DESCRIPTION OF THE INVENTION

The preferred embodiment of the present invention and its advantages are best understood by referring to FIGS. 1–4 of the drawings, like numerals being used for like and corresponding parts of the various drawings.

In accordance with the preferred embodiment of the present invention, an automated system is preferably used to identify a plurality of alternate low-cost travel arrangements that may be offered or recommended to a customer in response to the customer's request. The automated system accesses one or more computer reservation systems in order to obtain inventory information regarding, for example, the availability and listed rates of various travel arrangements such as airline flights, hotel accommodations, and rental cars. The automated system also stores other information, such as, for example, travel discounts available to the employees of a particular business entity, which may be used to reduce the listed rates of the travel arrangements. When the automated system receives a specific travel request from a customer, it retrieves the above-mentioned information and identifies a plurality of alternate, available low-cost travel arrangements. Because the system is automated, a travel agent using the system does not need to manually identify the plurality of alternate, low-cost travel arrangements. Consequently, the travel agent will be able to work more productively. Furthermore, the automated system substantially reduces or eliminates the opportunity for human error.

The following describes primarily how the present invention can find a plurality of alternate, low-cost airline flights in response to a request for airline travel. However, it should be understood that the present invention is not limited to such an exemplary embodiment. Thus, in an alternative embodiment, the present invention could be used to find a plurality of low-cost, alternate hotel accommodations or rental automobiles in response to a request for hotel or rental automobile service, respectively.

Figure 1:
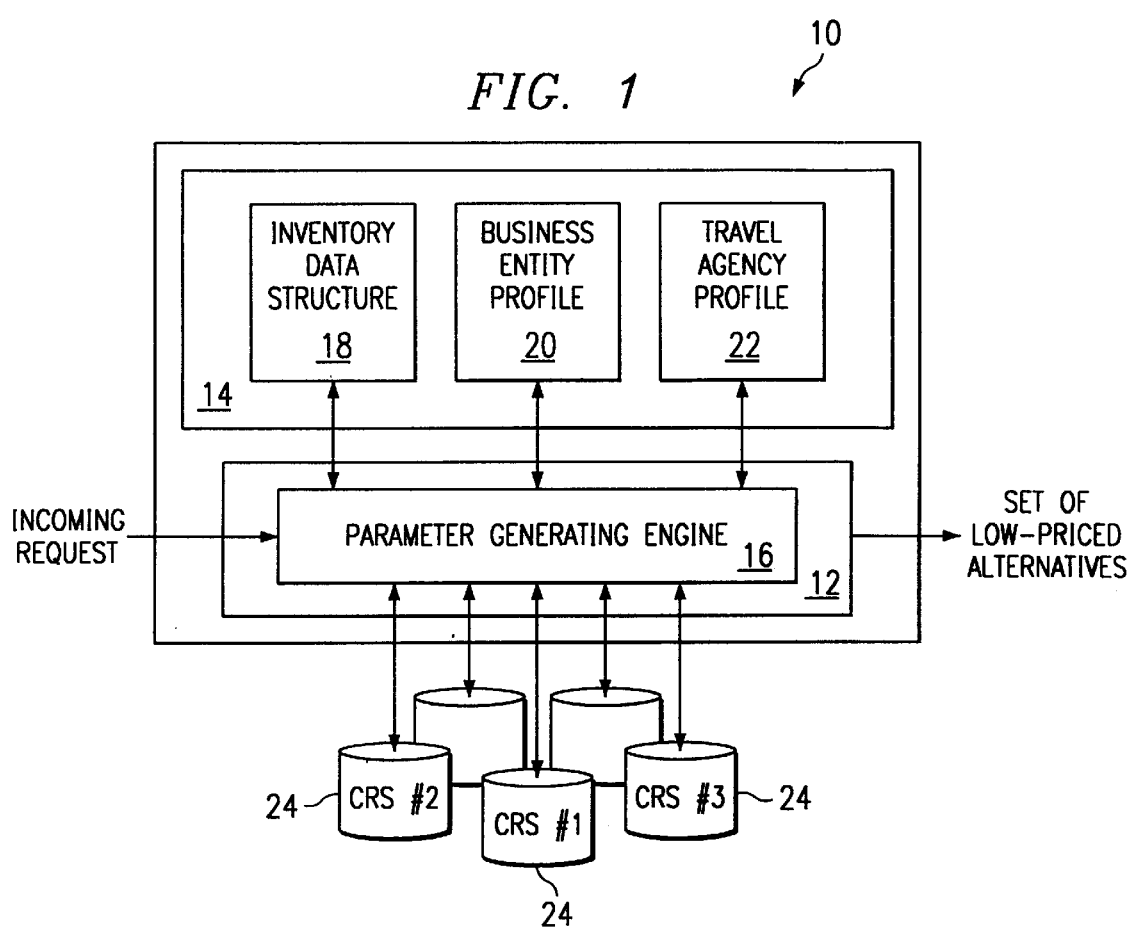
FIG. 1 is a top level, block diagram of an automated system for identifying alternate low-cost travel arrangements, in accordance with the preferred embodiment of the present invention.

FIG. 1 is a top level, block diagram that illustrates an automated system 10 for identifying a plurality of low-cost alternate travel arrangements in accordance with the preferred embodiment of the present invention. Referring to FIG. 1, the automated system (hereinafter, referred to as the "system") 10 is shown. System 10 includes a processing network 12 connected to a database 14.

Processing network 12 may consist of a single processor, or as described below with reference to FIG. 2, a plurality of interconnected processors Processing network 12 functions to run one or more software applications or modules, which can include a parameter generating engine module 16.

Parameter generating engine module 16 preferably includes two sub-modules or subroutines. The first sub-module of parameter generating engine module 16, which can be described as an inventory update sub-module, preferably functions to direct system 10 to periodically access and retrieve inventory information from one or more computer reservation systems 24 used by the travel agency. The inventory update sub-module further functions to store the inventory information in database 14. The second sub-module of the parameter generating engine module 16, which can be described as an analytical sub-module, operates independently of the inventory update module. The analytical sub-module functions to receive travel request information (which preferably specifies, for example, a city of departure, a city of destination, and approximate dates for travel) input into system 10, and in response, identifies one or more alternate, low-cost travel arrangements that can be suggested to the customer. For example, in response to a travel request for an airline flight between Dallas and Chicago on April 25th, the analytical sub-module may identify the following possible flight alternatives: (1) a Continental Airlines flight departing on April 23rd costing $180.00, (2) an American Airlines flight departing on April 24th costing $220.00, (3) a Delta Airlines flight departing on April 25th costing $350.00, and (4) an American Airlines flight departing on April 25th for $370.00. Parameter generating engine module 16 may incorporate one or more genetic algorithms (discussed in more detail below) which function to define sets of parameters used in identifying alternate, low-cost travel arrangements. The operation of parameter generating engine module 16 is described below in more detail with reference to FIG. 4.

Database 14 is preferably a relational database, which resides in a data storage medium (to be described in detail below). A business entity profile 20 is preferably maintained in the relational database 14 in system 10, for each business entity customer of the agency. In addition, the relational database preferably maintains an inventory data structure 18 and a travel agency profile 22.

Inventory data structure 18 includes inventory information obtained from one or more computer reservation systems 24 used by the travel agency. The customer reservation systems 24 provide travel service inventory information, such as airline flight, hotel, and rental automobile availability and rates. For airline flights, the inventory information may specify all flights between each particular city of departure and city of destination (otherwise known as a "city pair"), the arrival and departure times of the flights, the airline carriers providing such flights, a description of each flight as either direct or non-direct, the breakdown of all non-direct flights into separate legs or "segments," the identification of each segment of a flight as either domestic or international, the fare classes available on the flights, and pricing information (e.g., one-way ticketing, round-trip ticketing, city-to-city ticketing, or end-to-end ticketing) that can be used to determine the rates of various flights.

Business entity profile 20 preferably contains, at a minimum, information that is used to determine any discounts available to a traveler as an employee of a particular business entity customer of the travel agency. Thus, the business entity profile information may include any specialized codes used on each computer reservation system to discount the listed rate of travel arrangements for employees of the business entity. In addition, business entity profile 20 preferably contains information regarding restrictions, such as, for example, fare class restrictions, that a business entity customer may impose upon its employees for work-related travel. Furthermore, business entity profile 20 can contain other information that may reduce the cost of travel arrangements booked in response to a request, such as, for example, credit for any tickets returned by an employee of a particular business entity and/or free tickets earned by a business entity for frequent travel. The business entity profile 20 may also contain the names of all people employed by each business entity customer of the travel agency.

Travel agency profile 22 preferably contains, at a minimum, information relating to the travel agency which can be used to identify alternate, low-cost travel arrangements available for a particular request. Travel agency profile information thus may include for example, any discounts available to the travel agency which can be passed on to its customers (individual and/or business entity). This can include inventory for sale exclusively by the travel agency (e.g., space banking) and promotional discounts.

The plurality of computer reservation systems 24 used by the travel agency can be linked electronically with system 10. Each computer reservation system 24 may be one or more commercially available computer reservation systems such as, for example, SABRE® owned by American Airlines, WORLD SPAN® owned by Pars Marketing, APOLLO® owned by Galileo International Partnership, or SYSTEM ONE® owned by Amadeus Global Travel Distribution. Computer reservation systems 24 provide on-line travel service inventory information.

System 10 receives information relating to an incoming travel request from a customer. Typically, this travel request information specifies various parameters for travel, such as, for example, a city of departure and a city of destination (a city pair), and tentative times/dates of travel. In response to the travel request information, system 10 preferably identifies a plurality of low-cost alternate travel arrangements that are available between the city pair specified by the customer. If additional parameters (e.g., a particular airline carrier, fare class, exact date of travel, etc.) are specified in the travel request information, the number of alternate travel arrangements will usually be smaller.

Figure 2:
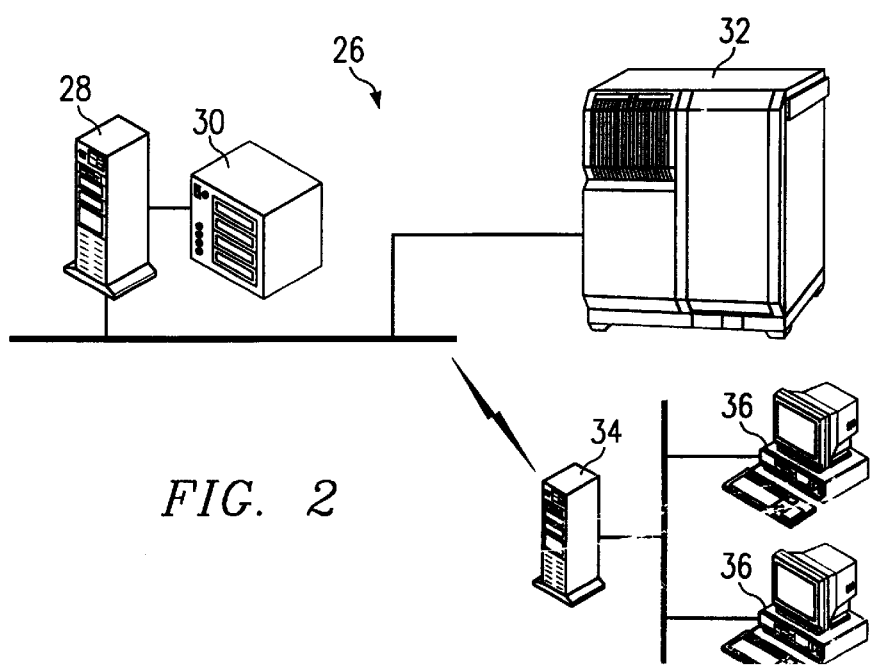
FIG. 2 is a simplified diagram of a computer-based system that can be used to implement the automated system shown in FIG. 1.

FIG. 2 is a simplified diagram of an exemplary computer-based system 26 that can be used to implement the automated system 10 for generating lowest-priced alternate travel itineraries shown in FIG. 1. Referring to the embodiment shown in FIG. 2, the computer-based system 26 can include a process server 28, a data storage device 30, a main frame computer 32, a local file server 34, and a plurality of work stations or desktop computers 36. Process server 28 preferably functions to process travel-related data and command information. A SUN SOLARIS 2.3 system has been successfully utilized as a process server 28. Data storage device 30 can be a mass storage subsystem of tapes and/or disk drives, which is electronically coupled to process server 28. In the preferred embodiment, a relational database resides in data storage device 30. Consequently, process server 28 may retrieve, process, and store the information in the relational database residing in data storage device 30.

The mainframe computer 32 may be linked electronically to process server 28 through a local or wide area network (LAN/WAN), for automated uploading and downloading of information therebetween. Any general purpose or medium-sized computer, which includes a central processing unit (CPU) and suitable RAM, ROM, and I/O circuitry can be utilized for mainframe 32.

Local file server 34 may be linked electronically to process server 28 by the same or a different local or wide area network, or by telecommunication lines through a modem (not explicitly shown). Additionally, as shown (for illustrative purposes only) in FIG. 2, process server 28 can be linked by a "gateway" interface communications processor to local file server 34. Local file server 34 is preferably connected to a plurality of workstations or desktop computers 36. A user of system 10, such as a travel agent may input and receive travel-and-customer related information (including the travel plan generated by system 10), and system information, respectively, through any of the workstations 36. Preferably, each workstation 36 is a desktop computer having at least a 486 processor or an operational equivalent. Systems programming for system 10 may be performed using a high level programming language, such as $C^{++}$.

The inventory data structure 18, the business entity profile 20, and the travel agency profile 22 (each of which contains information that can be used to identify low-cost alternative travel arrangements) are preferably stored in the relational database residing in data storage device 30. Process server 28 mainframe computer 32, local file server 34, and workstations 36 are preferably linked together. Consequently, each of these devices can directly access (e.g., store and retrieve) the low-cost travel arrangements information, if necessary.

Figure 3:
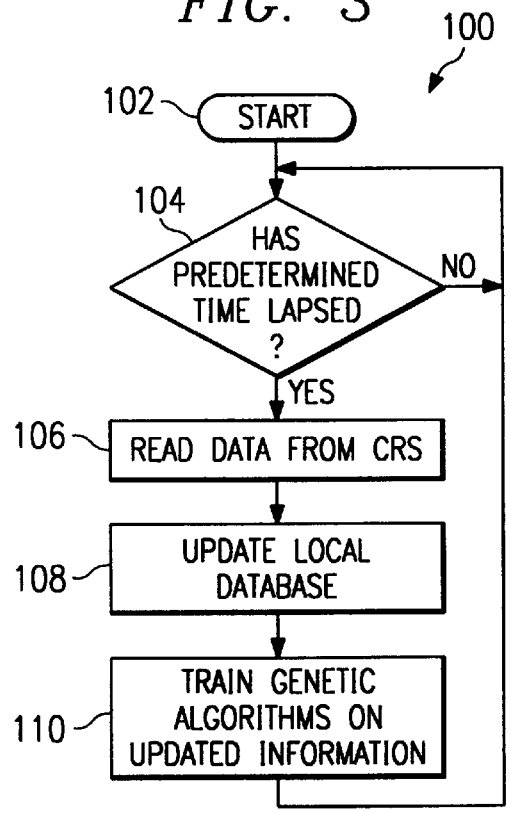
FIG. 3 is a flow diagram that illustrates a method of operating the automated system to obtain inventory information from one or more computer reservation systems, in accordance with the preferred embodiment of the present invention.
Figure 4:
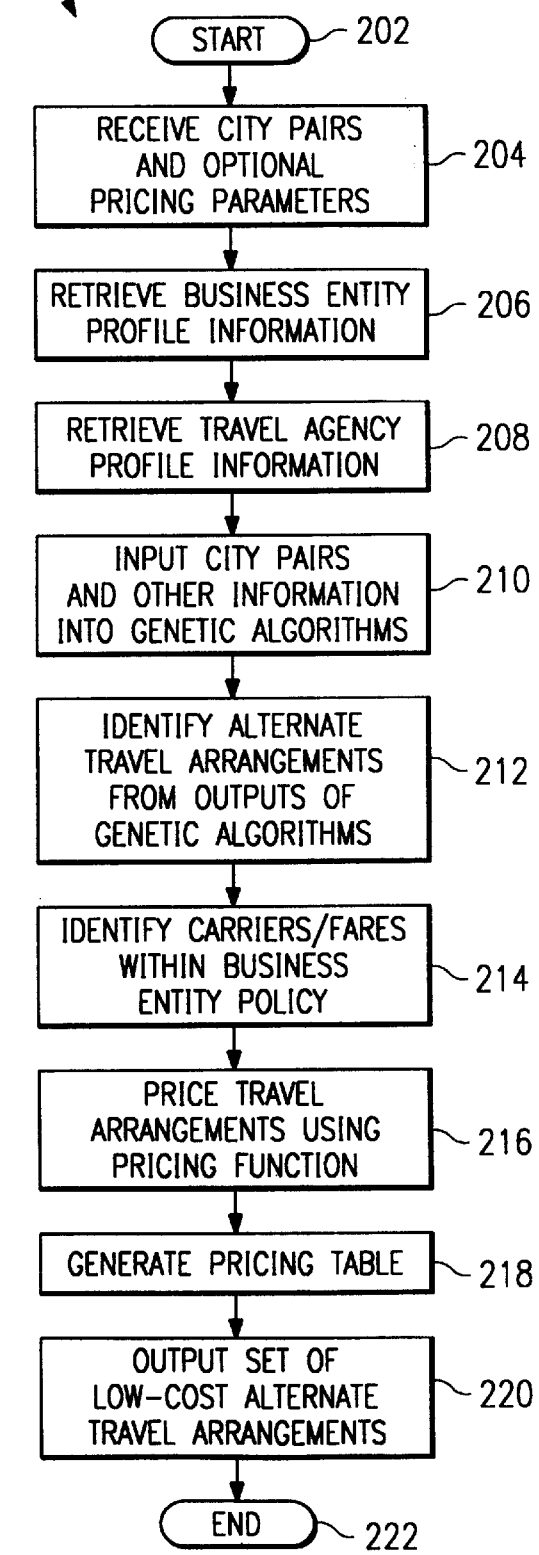
FIG. 4 is a flow diagram that illustrates a method of operating the automated system to identify a plurality of alternate low-cost travel arrangements, in accordance with the preferred embodiment of the present invention.

FIGS. 3 and 4 are flow diagrams illustrating two separate methods that can be performed by automated system 10 during its operation, in accordance with a preferred embodiment of the invention. Because system 10 preferably includes a plurality of processing devices (as shown in FIG. 2), the two methods can be performed simultaneously, each by a separate processing device in the system. Alternatively, separate processing devices can be used to perform the two methods, but processing is not necessarily simultaneous. In yet another alternative, a single processor may alternately perform both methods.

FIG. 3 is a flow diagram that illustrates a method 100 by which automated system 10 periodically obtains information from one or more computer reservation systems 24 and stores this information into database 14. Preferably, method 100 is automatically performed by system 10 without input from a system user, such as a travel agent.

At block 102, method 100 is initiated. More specifically, system 10 initiates the inventory update sub-module of parameter generating engine module 16, which controls system 10 throughout performance of method 100.

At block 104, system 10 determines whether a predetermined time ha s elapsed since inventory information was last obtained from computer reservation systems 24. Preferably, the predetermined time can be set by a user of the system according to the user's needs. For example, a travel agency which desires to have the most current inventory information available can set system 10 to access the computer reservation systems twice every hour. On the other hand, a travel agency which wishes to maintain a low hits-to-bookings ratio for each computer reservation system can set system 10 to access the computer reservation systems twice each day.

If the predetermined time has elapsed, at block 106, system 10, under the control of the inventory update sub-module, reads data from one or more computer reservation systems 24. If system 10 is connected to more than one computer reservation system 24, data can be read from each computer reservation system sequentially so that only one computer reservation system 24 is accessed at any given moment. Alternatively, system 10 can be configured to read data from a plurality of computer reservation systems simultaneously. The data read from the computer reservation systems 24 includes inventory information, such as, for example, all flights between each city pair, airline carriers providing the flights, fare classes available on the flights, a description of each flight as either direct or non-direct, the breakdown of all non-direct flights into separate segments, and the identification of each segment of a flight as either domestic or international.

At block 108, system 10 updates the inventory data structure 18 in database 14 using the information obtained from computer reservation systems 24.

At block 110, still under the control of the inventory update sub-module, system 10 trains the genetic algorithms using the updated inventory information. In general, a genetic algorithm is an algorithm capable of repeatedly sifting through a pool of candidate solutions to a particular problem, eliminating those solutions which fail, and adapting/modifying those solutions which succeed. Genetic algorithms are useful when the number of possible solutions is finite, but far too large to search exhaustively. Genetic algorithms require two components: (1) a representation of a possible solution, known as a chromosome; and (2) a fitness function which evaluates how well a proposed solution works (i.e., its "fitness"). In system 10, the genetic algorithms are trained by providing the most current pool of candidate solutions (i.e., the travel arrangements specified in the most recently obtained inventory information) to the genetic algorithms. System 10 then waits for the predetermined time to elapse again (block 104).

FIG. 4 is a flow diagram that illustrates a method 200 by which the automated system 10 can identify a plurality of alternate, low-cost travel arrangements in response to a travel request submitted by a customer. During the performance of method 200, a user of system 10, such as a travel agent, can communicate with the system, preferably using a workstation 36. For example, an agent can input system commands and travel request information by pressing appropriate keys (typing) on a workstation keyboard, or "clicking" on an option in a WINDOWS-type display. In return, the workstation 36 can display a list of alternate, low-cost travel arrangements identified by system 10.

Referring to FIG. 4, at block 202, method 200 is initiated. More specifically, system 13 initiates the analytical sub-module of parameter generating engine module 16, which controls system 10 throughout the performance of method 200.

At block 204, system 10 receives travel request information, which may be input by a travel agent. The travel request information preferably specifies, at a minimum, a departure city and a destination city (a city pair), and the tentative times and/or dates of travel. The travel request information may also specify additional parameters for travel, such as, for example, a particular airline carrier, fare class, or exact date of travel. Furthermore if the customer is new to the travel agency and is traveling for business, system 10 may prompt the agent to input information relating to the individual customer and the individual's employer, such as, for example, any frequent flyer program in which the individual participates and any discounts available to employees of the business entity.

At blocks 206 and 208, in response to the travel request information, the analytical sub-module directs system 10 to retrieve business entity and travel agency profile information from, respectively, business entity profile 20 and travel agency profile 22. It should be understood, however, that if the individual customer is not traveling for work-related matters, business entity information will not be retrieved and used in the subsequent analysis.

At block 210, system 10 inputs the city pair information, and other parameters specified in the travel request, into the genetic algorithms. In response to the input information, the genetic algorithms produce a set of parameters which can be used to identify travel arrangements that may be suitable for the customer. For example, if the travel request specifies airline travel from Miami to Washington D.C. on Monday, August 5th and returning on Friday, August 9th, then the genetic algorithms may output, at a minimum, the following parameters: (1) for travel from Miami to Washington D.C., an airline flight on any date from Friday, August 2nd to Wednesday, August 7th; and (2) for travel from Washington D.C. to Miami, an airline flight on any date from Wednesday, August 7th to Monday, August 12th. Any additional parameters (e.g., a particular airline carrier, fare class, exact date of travel, etc.) which are specified in the travel request information will also be included in the parameters output by the genetic algorithms.

At block 212 using information retrieved from inventory data structure 18 in database 14, system 10 identifies all of the alternate travel arrangements that fall within the parameters output by the genetic algorithms. With further reference to the Miami-Washington D.C. example described in the previous paragraph, system 10 may identify various possible travel arrangements, including the following: (1) a first American Airlines flight departing from Miami at 8:00 a.m. on Saturday, August 3rd, and a second American Airlines flight returning from Washington D.C. at 3:15 p.m. on Thursday, August 8th; (2) a first Delta Airlines flight departing from Miami at 10:00 p.m. on Friday, August 2nd, and a second Delta Airlines flight returning from Washington D.C. at 5:45 a.m. on Saturday, August 10th; (3) a first Delta Airlines departing from Miami at 4:30 p.m. on Saturday, August 3rd with a layover in Altanta, and a second Delta Airlines flight returning from Washington D.C. at 6:50 p.m. on Wednesday, August 7th with a layover in Atlanta; (4) a first United Airlines flight departing from Miami at 10:30 a.m. on Monday, August 5th, and a second United Airlines flight returning from Washington D.C. at 11:10 a.m. on Saturday, August 10th; (5) a first Continental Airlines flight departing from Miami at 2:45 p.m. on Sunday, August 4th with a layover in Orlando, and a second Continental Airlines flight returning from Washington D.C. at 7:55 p.m. on Thursday, August 8th; and (6) a American Eagle flight departing from Miami at 8:35 a.m. on Sunday, August 4th, and a second American Eagle flight returning from Washington D.C. at 4:50 p.m. on Sunday, August 10th. If additional parameters (e.g., a particular airline carrier, fare class, exact date of travel, etc.) are specified in the travel request information, the number of alternate travel arrangements will usually be smaller. Thus, referring to the example directly above, if the travel request had specified that only Delta Airlines flights should be considered, then the possible travel arrangements listed above would be reduced by two-thirds (i.e., only travel arrangements (2) and (3) would have been considered).

System 10 may repeat the steps described above with reference to blocks 210 and 212 several times in order to generate different sets of parameters and identify all travel arrangements falling within each set of parameters.

At block 214, using the business entity profile information retrieved from database 14, system 10 identifies which of the travel arrangements (falling within the parameters generated by the genetic algorithms) are provided by a preferred carrier of any business entity employing the individual traveler. For example, if a corporation specifies that its employees should travel only on American Airlines for work-related matters, system 10 eliminates from consideration all flight arrangements provided by another airline. System 10 also identifies which travel arrangements are within the business entity's fare class restrictions. Thus, for example, if a company restricts airline travel to business or coach class seats, system 10 will not consider any available first class seats when identifying alternate low-cost travel arrangements.

At block 216, system 10 prices the remaining travel arrangements. More specifically, information relating to travel arrangements that fall within the applicable business entity's guidelines is input into one or more pricing routines. Using the pricing information from the inventory data structure 18, the pricing routines price each of these travel arrangements by evaluating various aspects of each arrangement. For example, international segments (i.e., flight legs originating in one country and arriving in another) are priced separately from domestic segments (i.e., flight legs originating and arriving in the same country). Furthermore, different ticketing options, such as, one-way ticketing, round-trip ticketing, city-to-city ticketing, or end-to-end ticketing, are priced separately.

At block 218, the analytical sub-module directs system 10 to generate a table of the remaining travel arrangements according to the prices determined by the pricing routine(s). The table may be preferably structured to include, at a minimum, the price of each travel arrangement, the airline carrier for each travel arrangement, and the times/dates of travel. Preferably, the travel arrangements are listed in order of ascending price so that the lowest-cost travel arrangement appears at the beginning of the table and the highest-cost travel arrangement appears at the end of the table. The table can be stored in the relational database.

At block 220, system 10 outputs the table of alternate low-cost travel arrangements to a user of the system, for example, by displaying the table on a workstation 36. At block 222, method 200 is terminated. Once the travel agent has informed the customer making the request about the available low-cost alternate travel arrangements and the customer has selected a particular travel arrangement, system 10 may also be used to automatically make the reservations by accessing an appropriate computer reservation system 24.

In the manner described above, system 10 automatically identifies alternate, low-cost travel arrangements in response to a travel request. Thus, a travel agent is not required to manually determine the available low-cost arrangements, thereby increasing the agent's productivity. Furthermore, human error is substantially reduced or eliminated from the process.

Although the present invention and its advantages have been described in detail, it should be understood that various changes, substitutions, and alterations can be made therein without departing from the spirit and scope of the invention as defined by the appended claims.

What is claimed is:

1. An automated system for identifying alternate low-cost travel arrangements, comprising:

a database operable to store travel agency profile information and computer reservation system inventory information; and a processor operable to:
   retrieve inventory information from a plurality of computer reservation systems;
   store said inventory information in said database;
   in response to receipt of travel request information comprising a traveler's preferences, access said database to retrieve travel agency profile information and computer reservation system inventory information; and
   identify at least one alternate low-cost travel arrangement based at least in part on a relationship between the computer reservation system inventory information retrieved from the database and the travel request information.

2. The system of claim 1, wherein said processor is further operable to access said computer reservation systems at a predetermined interval.

3. The system of claim 1, wherein said database comprises a relational database.

4. The system of claim 1, wherein said processor comprises a file server.

5. The system of claim 1, wherein said processor is further operable to generate at least one set of travel parameters.

6. The system of claim 1, wherein said processor is further operable to automatically book travel reservations on said computer reservation systems.

7. The system of claim 1, wherein said database is further operable to store business entity profile information.

8. The system of claim 7, wherein said processor is further operable to retrieve business entity profile information in response to receipt of travel request information.

9. An automated system for identifying alternate low-cost travel arrangements, comprising:

a database operable to store travel agency profile information and computer reservation system inventory information; and a processing network connected to the database and operable to:
   access a plurality of computer reservation systems and retrieve computer reservation system inventory information;
   store said retrieved computer reservation inventory information in said database;
   receive travel request information comprising a traveler's preferences;
   access said database to retrieve travel agency profile information and computer reservation system inventory information in response to said received travel request information;
   generate at least one set of travel parameters in response to said received travel request information; and
   identify at least one alternate low-cost travel arrangement based at least in part on a relationship between the computer reservation system inventory information retrieved from the database and the set of travel parameters.

10. The system of claim 9, wherein said database is a relational database.

11. The system of claim 9, wherein said processor is further operable to access the computer reservation systems at a predetermined interval.

12. The system of claim 9, wherein said processor is further operable to automatically book travel reservations on at least one of said computer reservation systems.

13. The system of claim 9, wherein said database is further operable to store business entity profile information.

14. The system of claim 13, wherein said processor is further operable to access said database to retrieve business entity profile information in response to said received travel request information.

15. A method for automatically identifying alternate low-cost travel arrangements, comprising:

accessing a plurality of computer reservation systems and retrieving computer reservation system inventory information;
   generating travel agency profile information;
   storing said retrieved computer reservation system inventory information and said generated travel agency profile information in a database;
   receiving travel request information comprising a traveler's preferences;
   retrieving from said database said computer reservation system inventory information and said travel agency profile information in response to said received travel request information; and
   identifying at least one alternate low-cost travel arrangement based at least in part on a relationship between the computer reservation system inventory information retrieved from the database and the travel request information.

16. The method of claim 15, wherein said accessing step further comprises the step of accessing the computer reservation system at a predetermined interval.

17. The method of claim 15, further comprising the step of generating at least one set of travel parameters in response to said received travel request information.

18. The method of claim 15, wherein said identifying step further comprises the step of identifying which of a plurality of alternate travel arrangements is within a particular business entity's guidelines.

19. The method of claim 15, wherein said identifying step further comprises the step of pricing alternate travel itineraries.

20. The method of claim 15, further comprising the step of booking a travel reservation on said computer reservation systems.

21. The method of claim 15, further comprising the step of displaying said alternate low-cost travel arrangement to a user.

22. The method of claim 15, further comprising the step of generating business entity profile information.

23. The method of claim 22, further comprising the step of retrieving from said database said business entity profile information in response to said received travel request information.

* * * * *